United States Patent [19]
Buhl et al.

[11] Patent Number: 5,419,214
[45] Date of Patent: May 30, 1995

[54] SHIFT LEVER MOUNTING WITH INDEPENDENT MOVEMENT IN SHIFTING PLANE AND SELECTION PLANE

[75] Inventors: Reinhard Buhl, Bohmte; Wolfgang Kleiner, Wagenfeld; Volker Grube, Diepholz; Alfons Nordloh, Visbek; Metin Ersoy, Walluf, all of Germany

[73] Assignee: Lemförder Metallwaren AG, Lemförde, Germany

[21] Appl. No.: 81,403

[22] Filed: Jun. 22, 1993

[30] Foreign Application Priority Data

Jul. 2, 1992 [DE] Germany .................. 42 21 762.8

[51] Int. Cl.$^6$ .............................................. B60K 20/04
[52] U.S. Cl. ...................................... 74/473 P; 74/523; 74/543
[58] Field of Search .............. 74/473 P, 519, 523, 74/524, 543, 545; 403/122

[56] References Cited

U.S. PATENT DOCUMENTS

| 3,609,015 | 9/1971 | Weinbergstrasse | 403/122 X |
| 4,459,870 | 7/1984 | Gill et al. | 74/501.6 X |
| 4,693,135 | 9/1987 | LaRocca et al. | 74/473 P X |
| 4,879,922 | 11/1989 | Suzuki | 74/473 P X |

Primary Examiner—Charles A. Marmor
Assistant Examiner—Mary Ann Battista
Attorney, Agent, or Firm—McGlew and Tuttle

[57] ABSTRACT

A mounting for a shift lever (1) for the mechanical remote control of a selector shaft of a gear change box in motor vehicles, in which the shift lever (1) is mounted pivotably around a selection axis and around a shifting axis, which is at right angles thereto, by means of a spherical part (2) of a universal joint in a bearing box (4) in a housing (3) that is a rigid part of the body, and is connected by coupling members (7, 16) to a sliding selector shaft of a gear change box. The coupling members for transmitting the movement of the shift lever to the sliding selector shaft are connected, articulated around an axle (9, 12) each, to the spherical part (2) of a universal joint, wherein the axle extends in one pivoting plane of the shift lever (1) at right angles to the pivot axis of the shift lever in the other direction of pivoting.

9 Claims, 4 Drawing Sheets

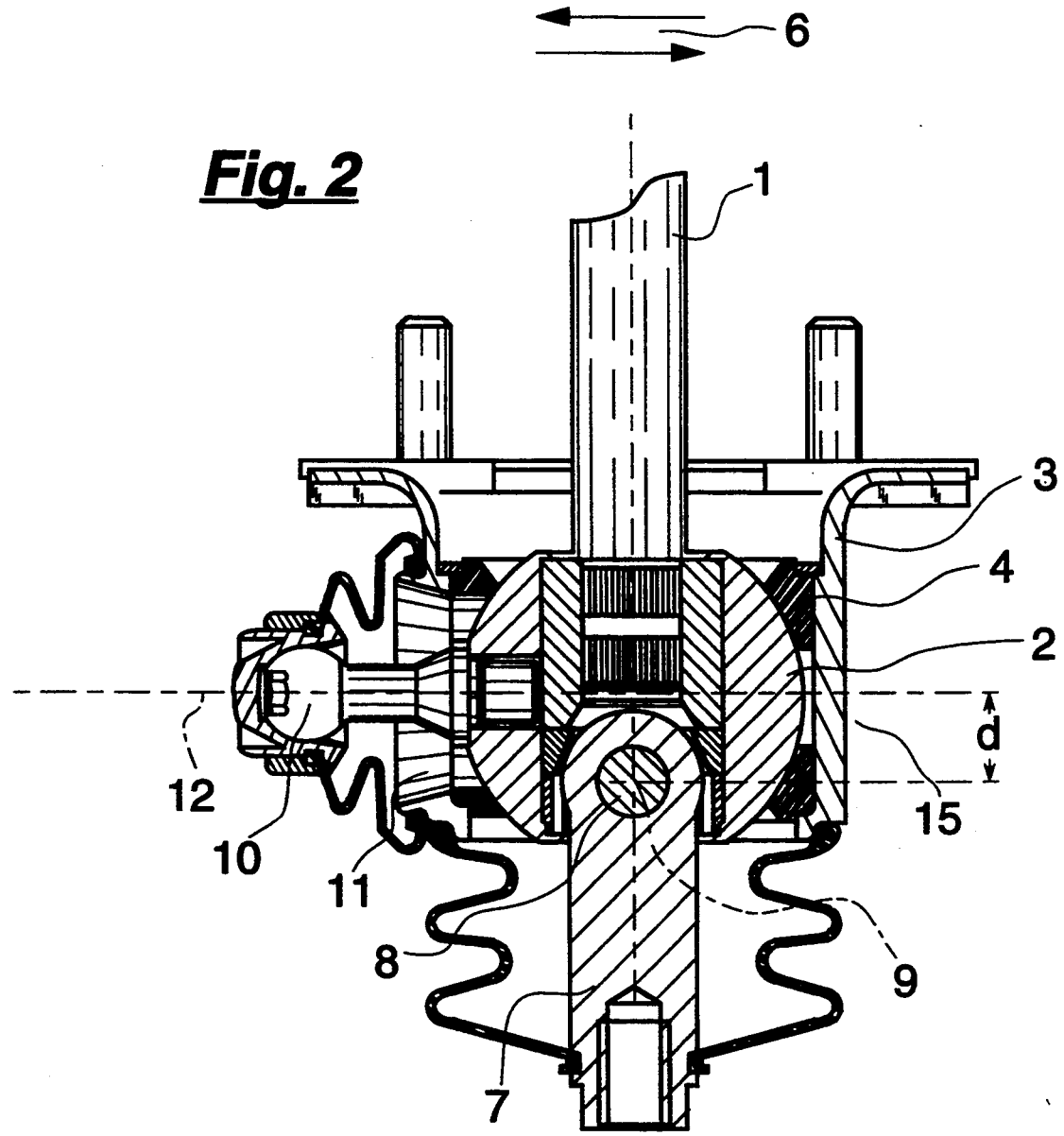

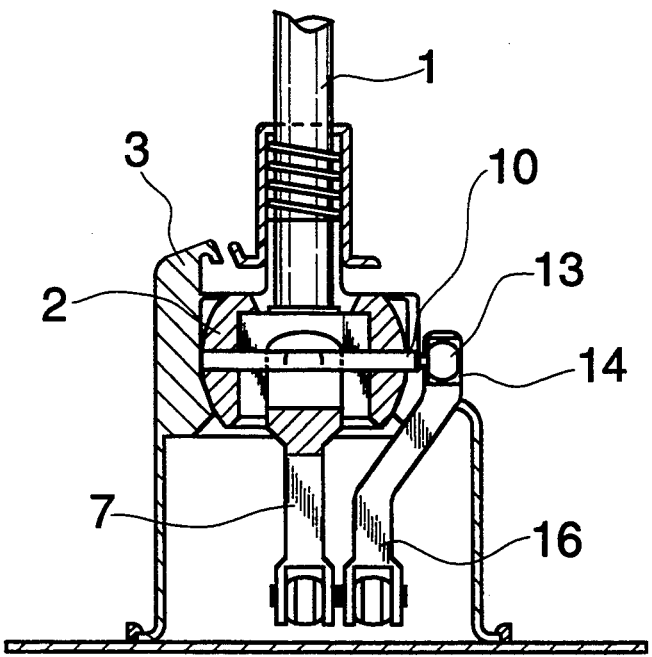
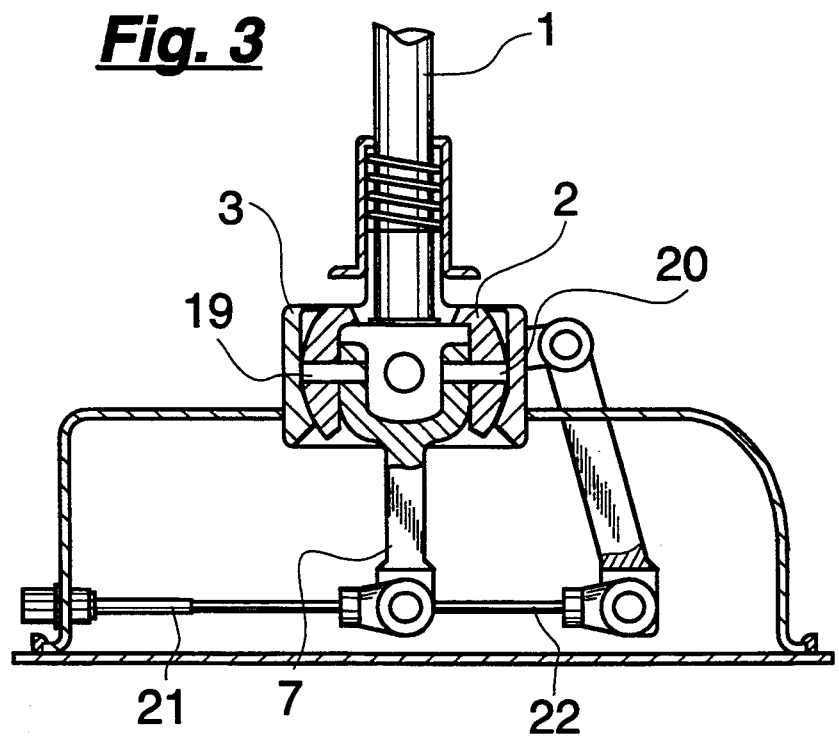

SHIFT LEVER MOUNTING WITH INDEPENDENT MOVEMENT IN SHIFTING PLANE AND SELECTION PLANE

FIELD OF THE INVENTION

The present invention pertains to the mounting of a shift lever for the mechanical remote control of a gear change box in motor vehicles, in which the shift lever is mounted pivotably around a selection axis and pivotably around a shifting axis, the shifting axis being located at an angle relative to the selection axis, and the shifting lever is connected by coupling members to a sliding selector shaft of a gear box.

BACKGROUND OF THE INVENTION

Such a shift lever mounting has been known from DE 38 08 272 C2 corresponding to U.S. Pat. No. 5,029,488 (which is incorporated herein by reference). To achieve accurate guidance of the shift lever over the selection path and the shifting path and to reduce the force needed for moving the shift lever, the shift lever is mounted flexibly around an axle in a shell-shaped spherical part of a universal joint. The universal joint is mounted—with pins, whose common axes are at right angles to the pivot axis of the shift lever in the spherical part of the universal joint—pivotably in recesses of a housing attached to the body. The universal joint is also mounted rotatably around the vertical axis over a limited angular range. The sliding selector shaft passes through the hinge mounting and is connected at its lower end to a coupling member. The coupling member allows for the transmission of the movement of the shift lever to the sliding selector shaft of the gear change box, so that the selecting movements of the shift lever are transmitted as a rotary movement, and the shifting movement as a linear displacement movement to one sliding selector shaft or to separate sliding selector shafts. Therefore, the coupling member must be resistant to extension and pressure, and be nonrotatable in both directions. Movements of the shift lever in the selection plane and in the shifting plane are bound to affect the respective other transmission movement of the coupling member or coupling members.

SUMMARY AND OBJECTS OF THE INVENTION

The object of the present invention is to design a shift lever mounting of the type described in the introduction, in which the movements of the shift lever in the selection plane and in the shifting plane are uncoupled from one another, i.e., they do not mutually influence each other, and this is achieved with the smallest possible number of components.

According to the invention, a mounting for a shift lever for a mechanical remote control of a selector shaft of a gear change box is provided. A spherical part of the universal joint is provided in a bearing box in a housing that is rigidly connected to the body of the vehicle. The spherical part mounts a shift lever pivotably around a selection axis and around a shifting axis. The spherical part is connected by coupling members to a sliding connector shaft of a gear change box. The coupling members are connected to the spherical part of the universal joint in an articulated manner around an axle positioned at a spaced location from a center of the spherical part of the universal joint. The axle extends in one of the pivoting planes of the shift lever at right angles to the pivot axis of the shift lever in the other direction of pivoting.

In a preferred embodiment of this general solution proposed, a coupling member for transmitting the shifting movement around an articulated axle located at right angles to the selection axis of the shift lever, and another coupling member for transmitting the selection movement of the shift lever around an articulated axle located at right angles to the shifting axis are connected to the spherical part of the universal joint in an articulated manner. It is achieved as a result that the hinge connection of the coupling member, for transmitting the selection movement around an axle located in the plane of the shifting movement, will act during the shifting movement. This action of the hinge connection is generally performed in parallel to the longitudinal direction of the vehicle. On the other hand, the hinge connection of the coupling member, for transmitting the shifting movement around an axle located in the plane of the selection movement, will act during the selection movement. This action of the hinge connection is generally performed at right angles to the longitudinal direction of the vehicle. This makes possible the mutually fully independent transmission of the shifting movement and the selection movement of the shift lever to one or more sliding selector shafts in the transmission arranged at a remote point in the motor vehicle. Bowden cables, consisting of a steel core movable in a metal casing, can be used as transmission members for this transmission. The solution proposed for the mutual uncoupling of the shifting movement from the selection movement makes it possible to arrange the points of attachment of such Bowden cables close to one another. This leads to another idea of the present invention, according to which the Bowden cables used to transmit the shifting movement and the selection movement to one or more sliding selector shafts in the transmission are guided in a common casing, as a result of which advantages will be achieved in terms of assembly and the manufacturing costs. According to a special proposal, a multi-coaxial Bowden cable, in which a plurality of steel cores forming a Bowden cable and metal casings enveloping same are arranged coaxially one inside the other, is used for transmitting the shifting movement and the selection movement.

The coupling member for transmitting the shifting movement around the articulated axle and a coupling member for transmitting the selection movement of the shift lever are linked to the spherical part of the universal joint. One coupling member (for transmitting the shifting movement) is articulated around an articulated axle located in the spherical part of the universal joint. Another coupling member (for transmitting the selection movement) is articulated around an articulated axle extending in an equatorial plane of the spherical part at a greater distance from a center of the spherical part. The linking of the coupling members is arranged outside of the housing at a pin which is rigidly connected to the spherical part. The coupling member connected to the pin is designed as an angle lever mounted on a component forming a rigid part of the body by means of a ball-and-socket joint. One arm of the angle lever is connected by the ball-and-socket joint to the pin and the other arm is directed approximately in parallel to the coupling member transmitting the shifting movement.

It is a further object of the invention to provide a gear shift structure and mounting which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a vertical sectional view taken through a shift lever mounting in the plane of the selection movement;

FIG. 3 is a sectional view corresponding to FIG. 1, but on a smaller scale, through a modified exemplary embodiment;

FIG. 5 is a sectional view offset by 90° in relation to FIG. 3 in the plane of the selection movement;

DETAILED DESCRIPTION OF THE PREFERRED EMBODIMENT

Figure 1:
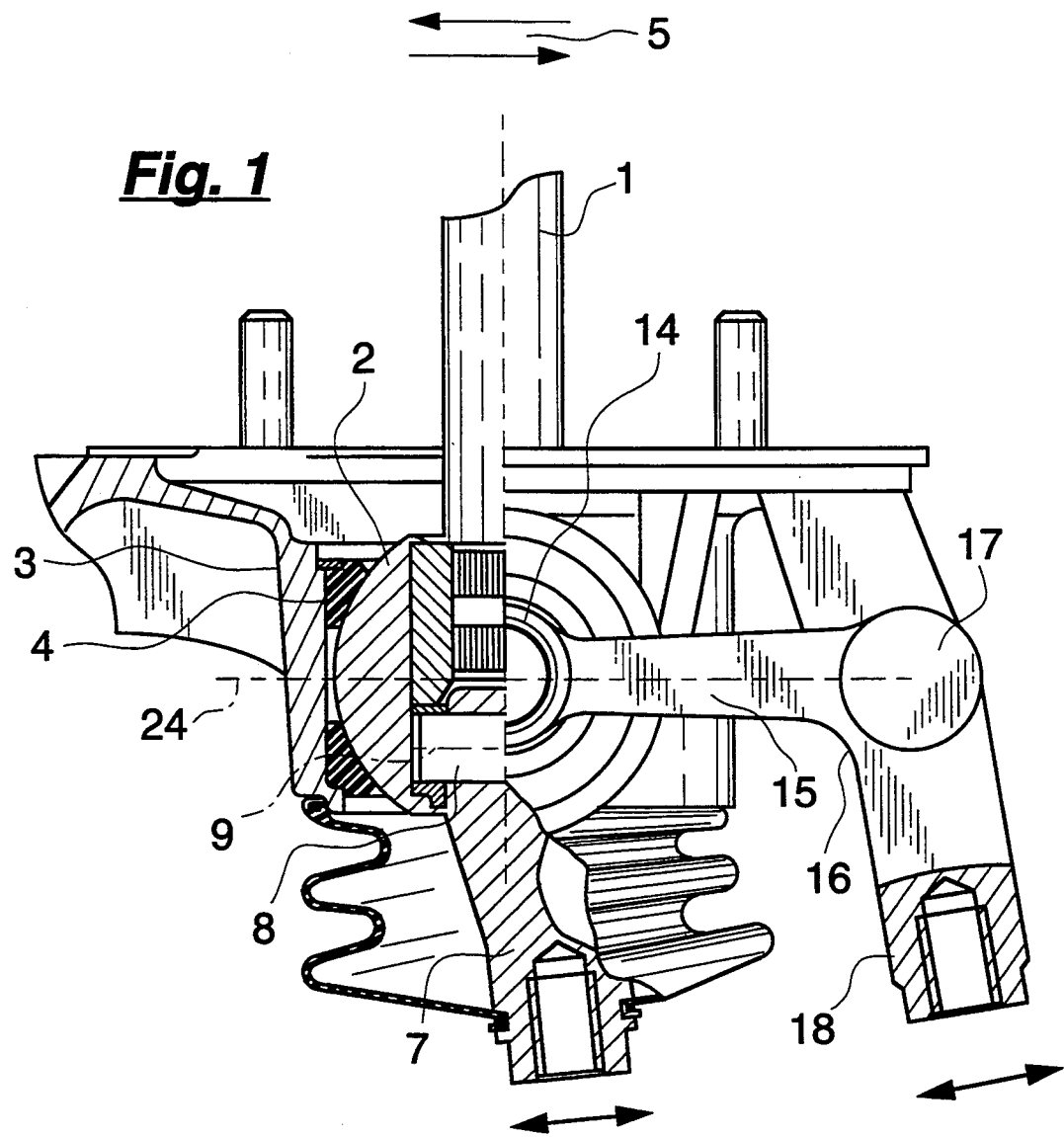
FIG. 1 is a vertical sectional view taken through a shift lever mounting in the plane of the shifting movement.

In the exemplary embodiments, the shift lever 1 for the mechanical remote control of a selector shaft of a gear change box in motor vehicles is rigidly connected to the spherical part 2 of a universal joint. The shift lever 1 is mounted movably in a ball-like manner with the spherical part 2 of a universal joint in a housing 3. The housing 3 can be attached to the body of the motor vehicle. To reduce the frictional forces during the movement of the spherical part 2 of a universal joint in the housing 3, a one-piece or multi-component bearing box 4 is provided. The bearing box 4 is made of a plastic or the like. The movement of the shift lever takes place according to the symbol represented by the double arrow 5 in FIG. 1, in parallel to the longitudinal direction of the vehicle. The selection movement takes place offset by 90° in relation hereto according to the symbol represented by the double arrow 6 in FIG. 2. The selection movement includes a pivoting of the shift lever with respect to a selector axis 24. The shifting movement includes a pivoting of the shift lever with respect to a shifting axis 12. To transmit the shifting movement of the shift lever 1, a coupling member 7 is connected to the spherical part 2 of a universal joint. The coupling member 7 is connected to pivot around a, pivot pin 8. Pivot pin 8 has an articulated axis (connection pivot axis) 9 which is located in the plane of the shifting movement at right angles to the selection movement at a certain distance from the center of the spherical part 2 of the universal joint. The selection movement of the shift lever 1 is transmitted by a pin 10. Pin 10 is rigidly connected to the spherical part 2 of the universal joint, is led out of the housing through an opening 11 provided in the housing 3, and the pin 10 has a longitudinal axis (the shifting axes) 12 which extends in the equatorial plane of the spherical part 2 of the universal joint. The pin 10 is provided with the spherical part 13 of a universal joint at its free end. The pin 10 is mounted with the spherical part 13 of the universal joint in an articulated shell 14 of corresponding shape. The articulated shell 14 is at the free end of one arm 15 of an angle lever 16. The articulated shell 14 and spherical part 13 provide an articulation location. The angle lever 16 is mounted, by means of a ball-and-socket joint 17, on the housing 3 or another component forming a rigid part of the body. The arc-shaped movement of the spherical part 13 of a universal joint, which deviates from a linear movement, is compensated by the ball-and-socket joint mounting in conjunction with the ball-and-socket joint 17 of the mounting of the angle lever 16 on the housing 3. Another coupling member for transmitting the selection movement of the shift lever 1 can be connected to the free arm 18 of the angle lever 16. Another coupling member for transmitting the shifting movement of the shift lever 1 to a selector shaft in the gear change box of the motor vehicle can be connected to the coupling member 7.

Figure 4:
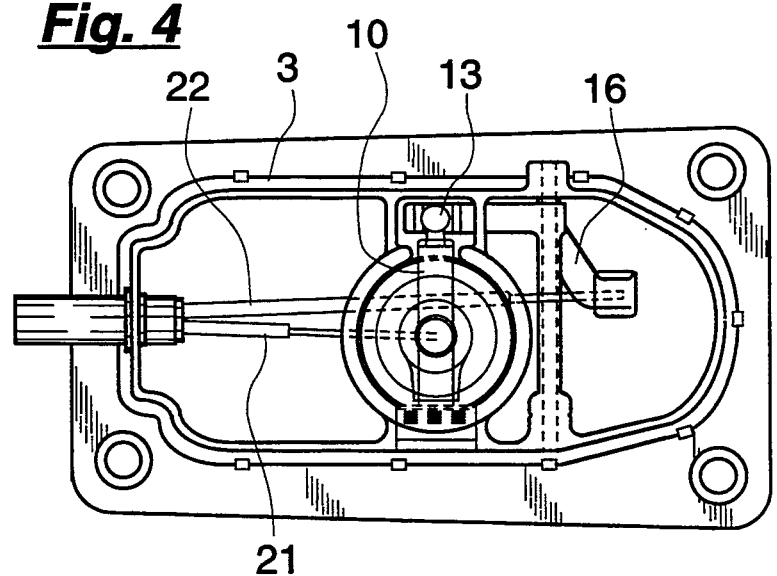
FIG. 4 is a top view of an exemplary embodiment corresponding to FIG. 3.

In the exemplary embodiment according to FIGS. 1 and 2, the pivot pin 8, with which is connected to the coupling member 7, is linked to the spherical part 2 of the universal joint. The pin 8 is arranged at a certain distanced from the equatorial plane, in which the longitudinal axis 12 of the pin 10 extends. This makes possible low-cost manufacture, on the one hand, and space-saving accommodation, on the other hand, but it has the consequence that selection movements of the shift lever 1 still lead to a slight, albeit negligible effect on the coupling member 7. To avoid this effect, the exemplary embodiment according to FIGS. 3 through 5 provides a mounting of the coupling member 7 for transmitting the shifting movements with an articulated axle which extends in the equatorial plane of the spherical part 2 of the universal joint. To achieve this, the attaching end of the coupling member 7 is of fork-shaped design and is mounted in an articulated manner by means of two pivot pins 19 and 20. Pivot pins 19 and 20 are arranged coaxially in relation to one another in an inner recess of the spherical part 2 of the universal joint, which recess is open at the bottom. In addition, the angle lever 16, which is linked in this exemplary embodiment to the spherical part 13 of the universal joint at the end of the pin 10, is mounted cardanically movably on an axle, e.g., by means of a prior-art molecular hinge mounting. The arm 18 of the angle lever 16, which can be connected to another coupling member, is designed as an arm bent at right angles. With this angle bend the two connection points of the coupling members 7 and 16, for transmitting the movements of the shift lever to one or more sliding selector shafts in the gear change box, are located at closely spaced locations from one another, as is especially apparent from FIG. 5. Finally, FIG. 5 shows that the pin 10, which carries the spherical part 13 of the universal joint at one of its ends, may be designed as a continuous pin, so that it passes through the free space created by the forked design of the coupling member 7.

Figure 8:
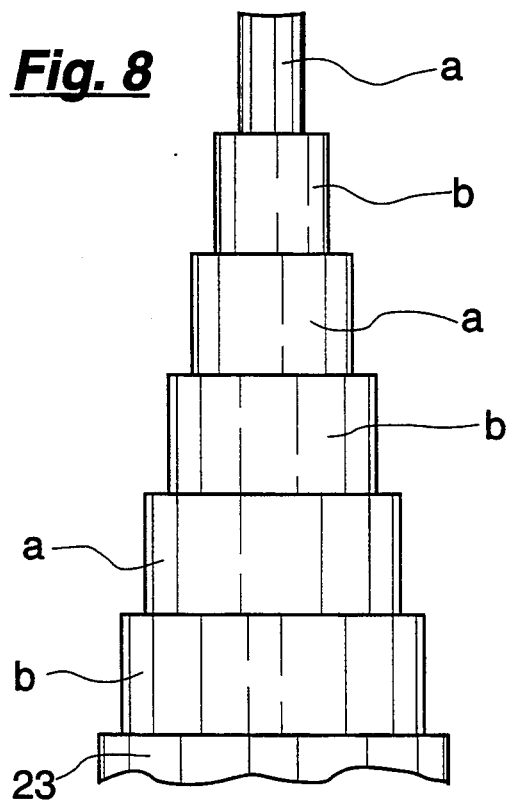
FIG. 8 is a schematic representation of the exemplary embodiment according to FIG. 7.
Figure 7:
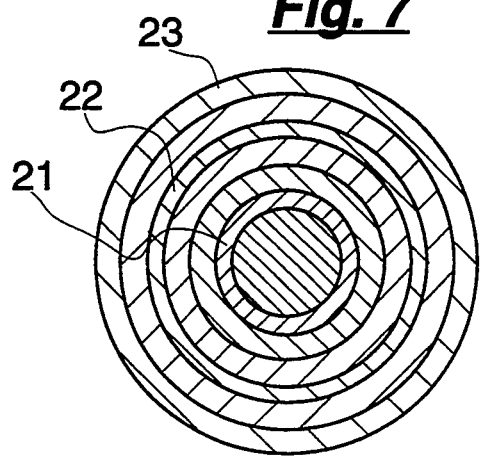
FIG. 7 is a cross sectional view taken through another exemplary embodiment through coupling member.
Figure 6:
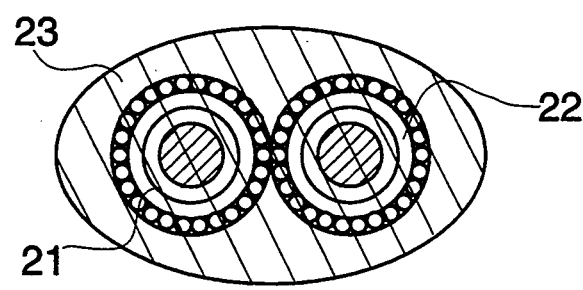
FIG. 6 is a cross sectional view taken through a coupling member.

The coupling members, which can be connected to the coupling members 7 and 16 (18), consists of brackets, rods or the like in the known manner. According to a special embodiment of the present invention, Bowden cables 21 and 22 consisting of a steel wire core and a metal casing sheathing same are provided for this corresponding to the representation in FIGS. 3 through 8. The two Bowden cables 21 and 22 for transmitting the shifting movements and the selection movements of the shift lever 1 may be accommodated in a common hose casing 23 due to the design shown in FIGS. 3 through 5, as a result of which assembly is facilitated and cost is saved. The cross section of such an arrangement is shown as an example in FIG. 6. FIG. 7 shows the cross section of a solution that is different from this. The Bowden cables 21 and 22 used to transmit the movements of the shift lever are arranged here as a multi-coaxial Bowden cable in a common outer casing, wherein the Bowden cable surrounding the inner Bowden cable, and each additional Bowden cable has a tubular core, which in turn slides on the jacket of the metal casing of the corresponding inner Bowden cable. This is represented schematically in FIGS. 7 and 8. The letters a in the latter figure designate a metal core, and the letters b designate a metal casing surrounding same.

What is claimed is:

1. Mounting arrangement of a shift lever for a mechanical remote control of a sliding selector shaft of a gear change box in a motor vehicle body, comprising:
    said shift lever;
    a bearing box provided in a housing attached to a rigid part of the vehicle body;
    a spherical part of a universal joint positioned in said bearing box, said spherical part being connected to said shift lever for moving said shift lever pivotably around a selection axis and around a shifting axis, said shifting axis being at an angle to said selection axis;
    a selection coupling member for translating movement about said selection axis to said sliding selector shaft of said gear change box and a shifting coupling member for translating movement about said shifting axis to a sliding selector shaft of a gear change box; and
    connection means for connecting said shifting coupling member to said spherical part of the universal joint in an articulated manner around a connection pivot axis, said connection pivot axis being disposed at a spaced location from the center of said spherical part, said connection pivot axis being within said spherical part, said connection pivot axis extending at a right angle to said shifting axis of said shift lever.

2. Mounting arrangement according to claim 1, wherein:
    said shifting coupling member and said selection coupling member are linked to said spherical part.

3. Mounting arrangement according to claim 1, wherein:
    said selection coupling member is articulated around said shifting axis, said shifting axis extending in an equatorial plane of said spherical part, said selection coupling member extending at a right angle to said shifting axis and being spaced a distance from the center of said spherical part.

4. A mounting arrangement according to claim 1, wherein:
    a connection means for connecting said selection coupling member to said spherical part comprising a pin rigidly connected to said spherical part and extending out of said housing, said selection coupling member being connected to said pin.

5. A mounting arrangement according to claim 4, wherein:
    said selection coupling member connected to said pin is formed as an angle lever, said angle lever being mounted on a component forming a rigid part of said vehicle body, one arm of said angle lever being connected to a ball-and-socket joint and to said pin and another arm of said angle lever extending approximately in parallel to said shifting coupling member.

6. A mounting arrangement according to claim 1, wherein:
    a Bowden cable is attached to each of said coupling members.

7. A mounting arrangement according to claim 1, wherein:
    said shifting coupling member being connected to a first Bowden cable and said selection coupling member being connected to a second Bowden cable, said first Bowden cable and said second Bowden cable being arranged in a common casing.

8. A mounting arrangement according to claim 1, wherein: said shifting coupling member being connected to a first Bowden cable and said selection coupling member being connected to a second Bowden cable, said first Bowden cable and said second Bowden cable being arranged in a common closed casing wherein said first Bowden cable and said second Bowden cable are designed as coaxial Bowden cables.

9. Mounting arrangement of a shift lever for a mechanical remote control of a sliding selector shaft of a gear change box in a motor vehicle body, comprising:
    said shift lever;
    a bearing box provided in a housing attached to a rigid part of the vehicle body;
    a spherical part of a universal joint positioned in said bearing box, said spherical part being connected to said shift lever for moving said shift lever pivotably around a selection axis and around a shifting axis, said shifting axis being at an angle to said selection axis;
    a selection coupling member for translating movement about said selection axis to said sliding selector shaft of a gear change box and said shifting coupling member for translating movement about said shifting axis to said sliding selector shaft of said gear change box; and
    connection means for connecting said shifting coupling member to said spherical part, said connection means including a pivot pin disposed at a spaced location from said center of said spherical part and disposed within an outer contour of said spherical part, said pivot pin defining a connection pivot axis, said connection pivot axis extending at a right angle to said shifting axis of said shift lever.

* * * * *